Aug. 16, 1960     R. B. MALINA     2,949,127
CURRENT ROTATING CHECK VALVE
Filed Dec. 22, 1958
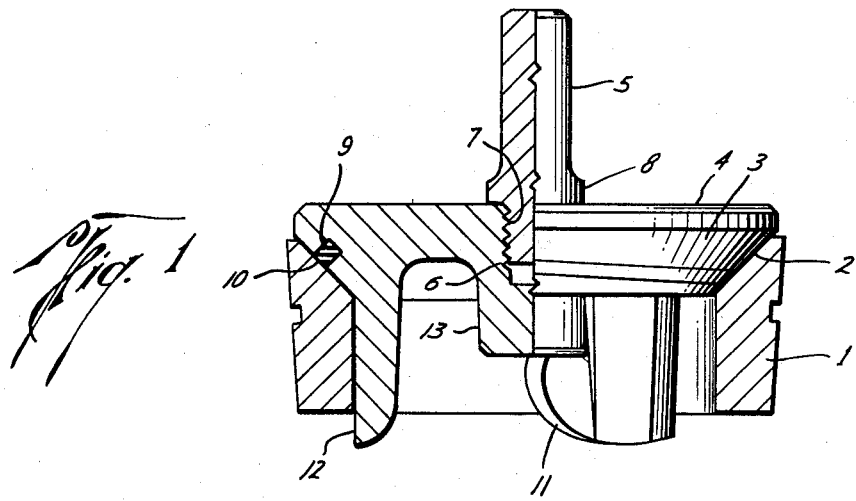
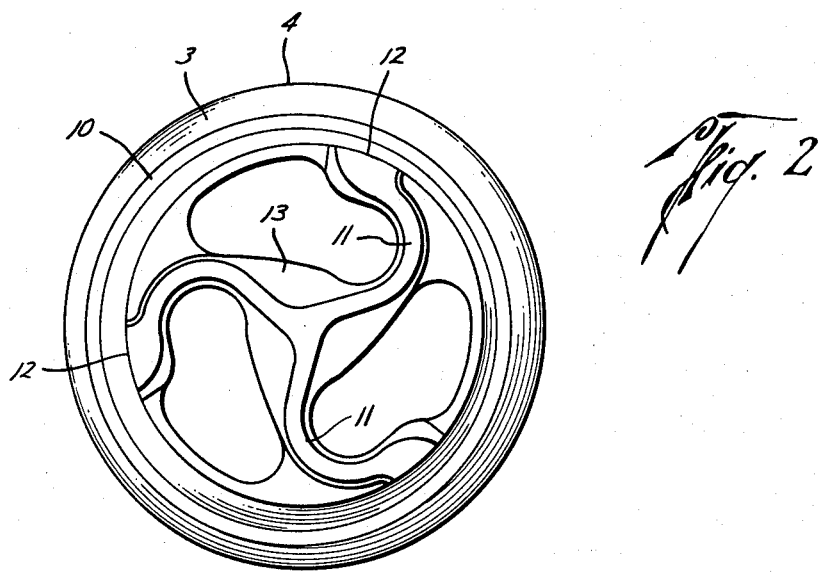
Robert B. Malina
INVENTOR.
BY *Pamela O. Wyatt*
ATTORNEY

United States Patent Office 2,949,127
Patented Aug. 16, 1960

2,949,127

CURRENT ROTATING CHECK VALVE

Robert B. Malina, Houston, Tex., assignor to Pioneer Well Tools, Inc., Houston, Tex., a corporation of Texas Filed Dec. 22, 1958, Ser. No. 785,305

3 Claims. (Cl. 137—332)

This invention relates to new and useful improvements in a valve such as are used in mud pumps and the like.

It is an object of this invention to provide a valve having a rotating, vertically movable body member having novel sealing means to provide a greater wearing surface on the seating face of the valve.

It is another object of this invention to provide a valve having a valve seat and a valve body member, and a rubber seal mounted in the body member in an eccentric groove, so that as the body member rotates the rubber seal will contact the seat at a different position upon each closing of the valve, thus extending the wearing surface of the seat and effecting a uniform wear, extending the life of the valve without detracting from the efficiency of the sealing function as the sealing surfaces wear.

With the above and other objects in view, the invention has relation to certain novel features of construction and operation more particularly defined in the following specifications and illustrated in the accompanying drawings, wherein:

Figure 1 is an elevational view of the valve, partially in cross section, and

Figure 2 is a bottom view of the valve body member.

Referring now more particularly to the drawings, the numeral 1 designates the valve seat member having an inwardly tapering seating face 2 and against which the inwardly tapered seating face 3 of the body member 4 seats. The usual guide stem 5 is detachably mounted to the body member 4 by means of the internally threaded socket 6 formed in a hub portion 13 and the externally threaded portion 7 of the stem 5. The stem 5 has a flange 8 designed to restrict the downward movement of the stem 5 into the socket 6.

An eccentric groove 9 is cut in the seating face 3 of the body member 4 and a suitable yieldable packing as 10 is mounted in the groove 9. By cutting the groove 9 off-center in the seating face 3, the area of contact of the member 10 with the face 2 is also off-center.

The valve body member 4, when seated in the seat 1, blocks the flow of fluid through the valve. The vanes 11, having their outer surfaces 12 slidably engaging the side wall of the seat 1 and their inner surfaces cupped and curved outwardly at the upper portions thereof, form barriers in the path of the fluid flowing between the seat 2 and the body member 4 when the body member 4 is lifted off of the seat 2. The body member 4 forms a block against the flow of the fluid in its flow path, forcing the fluid laterally through the the opening between the seat 2 and the body member, and the force of flow of this fluid, under pressure, against the vanes 11, will cause the body member 4 to rotate as it is lifted off of the seat 2.

Upon impulse stroke of a pump (not shown), the force of the fluid flow is upwardly against the vanes 11 which will impart rotation to the valve body member 4 as the body member 4 is lifted and the fluid passes outwardly between the seat 1 and the body member 4, and when it again resumes its position on the seating face 2, upon completion of the impulse stroke of the pump, it will have moved through rotation and changed the contact area between the seal 10 and the seating face 2, thus greatly increasing the area of the wearing surface of the seating face 2, and effecting a uniform wear over the contact area.

While the foregoing is considered a preferred form of the invention, it is by way of illustration only, the broad principle of the invention being defined by the appended claims.

What I claim is:

1. In a valve a seating member having an inwardly tapering seating face, a body member vertically movable within the seating member and having an inwardly tapered annular face having a common axis with the body member and being movable into contact with the seating face of the seating member, an eccentric groove in the seating face of the body member formed in a plane which is positioned at an angle to a plane normal to the axis of the body member and a yieldable packing means mounted in said groove, and means on said body member for rotation of said body member during its vertical movement in said seat.

2. In a valve, a valve seat having an inwardly tapering seating face, a body member vertically movable in said seat and having an inwardly tapered seating face movable into seating relation with said seating face of said seat, an eccentric groove formed in the seating face of said seat formed in a plane which is positioned at an angle to a plane normal to the axis of the body member and a packing means in said groove, means for rotating said body member during its vertical movement in said seat.

3. In a valve, a valve seat having an inwardly tapering seating face, a body member vertically movable in said seat and having an inwardly tapered seating face movable into seating relation with said seating face of said seat, an eccentric groove formed in the seating face of said body member formed in a plane which is positioned at an angle to a plane normal to the axis of the body member and a packing means in said groove, means for changing the line of contact of said packing means with said seating face in said seat as the valve opens and closes.

References Cited in the file of this patent

UNITED STATES PATENTS

| 977,105 | Lippold | Nov. 29, 1910 |
| 1,990,557 | Melott | Feb. 12, 1935 |
| 2,690,322 | Stansfield | Sept. 28, 1954 |